United States Patent
Zhao et al.

(10) Patent No.: US 7,254,268 B2
(45) Date of Patent: Aug. 7, 2007

(54) OBJECT EXTRACTION

(75) Inventors: Bin Zhao, Zhejiang (CN); Na Li, Zheijang (CN)

(73) Assignee: ArcSoft, Inc., Fremont, CA (US)

(*) Notice: Subject to any disclaimer, the term of this patent is extended or adjusted under 35 U.S.C. 154(b) by 1010 days.

(21) Appl. No.: 10/123,019

(22) Filed: Apr. 11, 2002

(65) Prior Publication Data

US 2003/0194131 A1    Oct. 16, 2003

(51) Int. Cl.
- G06K 9/46 (2006.01)
- G06K 9/34 (2006.01)
- H04N 9/74 (2006.01)
- H04N 5/225 (2006.01)
- G09G 5/02 (2006.01)

(52) U.S. Cl. ............ 382/190; 382/173; 382/191; 382/192; 382/193; 348/586; 348/169; 345/604

(58) Field of Classification Search ........... 382/173, 382/190–194; 348/586–587; 345/604
See application file for complete search history.

(56) References Cited

U.S. PATENT DOCUMENTS

| | | | | |
|---|---|---|---|---|
| 5,488,433 A | * | 1/1996 | Washino et al. | 348/722 |
| 5,546,475 A | * | 8/1996 | Bolle et al. | 382/190 |
| 6,661,918 B1 | * | 12/2003 | Gordon et al. | 382/173 |
| 6,819,796 B2 | * | 11/2004 | Hong et al. | 382/173 |
| 6,912,313 B2 | * | 6/2005 | Li | 382/219 |
| 2002/0037103 A1 | * | 3/2002 | Hong et al. | 382/173 |

* cited by examiner

*Primary Examiner*—Joseph Mancuso
*Assistant Examiner*—Hadi Akhavannik
(74) *Attorney, Agent, or Firm*—Patent Law Group LLP

(57) ABSTRACT

A video sequence is processed to extract one or more objects. The extracted objects are used to create a new video sequence. In particular, a user is able to select a background and/or an audio recording. Alternatively, the object extraction system automatically selects a background and/or audio recording. The extracted objects are integrated into the selected background and/or the audio recording is added to form a new video sequence.

66 Claims, 14 Drawing Sheets
(7 of 14 Drawing Sheet(s) Filed in Color)

OBJECT EXTRACTION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Invention

The invention is generally related to digital image processing, and, in particular, is related to extracting objects from a first sequence of frames and using the extracted objects to create a new sequence of frames.

2. Description of Related Art

Video cameras are becoming more popular today, as they become more widely available, at lower prices. A video camera records sequential images within "frames." A frame is a representation of an image at an instant of time. Typically, each frame represents the image at a different instant in time. When several frames are recorded, at sequential instances in time, and are shown to the human eye in quick succession, the human eye is able to see motion in the video sequence (e.g., a sequence of frames). For example, video (i.e., moving pictures) normally consists of motion, including object motion, such as a bird flying, and camera motion, such as camera panning, zooming, and tilting.

Video object segmentation refers to identifying objects, which may be moving, through frames of a video sequence. Efficient video object segmentation is an important topic for video processing. General video object segmentation is considered to be an ill-posed problem. An ill-posed problem is one that, theoretically, cannot be solved. For example, a two-dimensional photograph does not contain three-dimensional information (i.e., the three-dimensional information is lost when a two-dimensional photograph is taken of a three-dimensional scene). Therefore, converting a two-dimensional photograph to a three-dimensional image is considered to be an ill-posed problem. Likewise, segmenting objects in frames of a video sequence is considered to be an ill-posed problem. In particular, the object of interest may be different for the same scene depending on the user or the application. Automatic segmentation is therefore a problem without a general solution.

Real-time automatic segmentation techniques for specific applications, however, have been attempted. These techniques are directed to applications such as video surveillance, traffic monitoring, and video-conferencing. Video sequences in these applications are typically taken from fixed cameras in poor environments and are in need of robust object segmentation techniques.

For more information on video surveillance applications, see Ismail Haritaoglu, David Harwood, and Larry S. Davis, "W4: Who? When? Where? What'? A Real Time System for Detecting and Tracking People," presented at Proceedings of the Third International Conference on Automatic Face and Gesture Recognition (FG'98), pp. 1–6, April 1998, and, Paul L. Rosin, "Thresholding for Change Detection," presented at Proceedings of International Conference on Computer Vision, pp. 1–6, 1998, each of which is entirely incorporated by reference herein.

For more information on video surveillance applications, see Nir Friedman and Stuart Russell, "Image Segmentation in Video Sequences: A Probabilistic Approach," presented at Proceedings of the 13th Conference on Uncertainty in Artificial Intelligence, Morgan Kaufmann, pp. 1–13, 1997, which is entirely incorporated by reference herein.

A typical approach to extracting objects from a static background scene subtracts the background scene and labeling what remains as objects. The main idea of background subtraction is comparing a current frame with a reference background scene according to certain criteria. The background scene may be obtained, for example, by capturing a static scene with a video camera. Elements different from the background scene are designated as foreground objects.

A number of systems performing video object segmentation use background subtraction techniques. However, many background subtraction techniques are sensitive to shadows or illumination changes, and so they are unable to accurately extract objects. Shadows occur when a light source on a scene is obstructed. Illumination refers to the amount of source light on a scene. Both shadow and illumination may change frame to frame due to, for example, movement of objects. Thus, these background subtraction techniques may incorrectly classify a pixel that is in the background in a first frame, but in shadow in a second frame, as a foreground pixel.

For more information on background subtraction see, N. Friedman, and S. Russell, "Image Segmentation in Video Sequences: A Probabilistic Approach," Proceedings of the 13th Conference on Uncertainty in Artificial Intelligence, Morgan Kaufmann, 1997; Thanarat Horprasert, David Harwood. and Larry S. Davis, "A Statistical Approach for Real-time Robust Background Subtraction and Shadow Detection," presented at Proc. IEEE ICCV'99 FRAME-RATE Workshop, Kerkyra, Greece, pp. 1–19, September 1999 (hereinafter referred to as "Horprasert"); Alexandre R. J. Francois and Gerard G. Medioni, "Adaptive Color Background Modeling for Real-Time Segmentation of Video Streams," presented at Proc. of International on Imaging Science, System, and Technology, pp. 1–6, 1999 (hereinafter referred to as "Francois"); and, Ahmed Elgammal, David Harwood, Larry Davis, "Non-parametric Model for Background Subtraction," presented at FRAME-RATE: Framerate Applications, Methods and Experiences with Regularly Available Technology and Equipment, Corfu, Greece, pp. 1–17, Sep. 21, 1999; each of which is entirely incorporated by reference herein.

In some cases, objects are segmented in color spaces other than the RGB color space. For example, Wren detects changes in a YUV color space. For further information, see Christopher Wren, Ali Azarbayejani, Trevor Darrell, and Alex Pentland, "PFinder: Real-Time Tracking of the Human Body," presented at IEEE Transaction on Pattern Analysis and Machine Intelligence, pp. 1–7, 1997 (hereinafter referred to as "Wren") which is entirely incorporated herein by reference. The YUV color space is defined by the Commission International de L'Eclairage (CIE), which is an international committee for color standards. The YUV color space may be used, for example, in Phase Alternation Line (PAL) television (an analog television display standard), where the luminance (i.e., a measure of the amount of energy an observer perceives from a light source) and the chrominance (i.e., hue and saturation together) are treated as separate components. In YUV systems, a luminance signal is represented with "Y", while chrominance signals are represented by "U" and "V."

Horprasert uses a color model consisting of brightness distortion and chromaticity distortion to present a color image. Both Wren and Horprasert overcome this problem to some extent but are not as robust as expected (i.e., they fail to segment objects under some conditions). Francois proposes to perform segmentation in an HSV color space, but because of improper use of hue and saturation components, Francois also runs unsteadily (i.e., sometimes classifies pixels incorrectly). The HSV color space refers to hue, saturation, and value. Hue refers to a pure color as perceived by the human eye (e.g., red, green, or blue). Hue identifies the color and indicates where along the color spectrum the color lies. This value wraps around so that the extreme high value (white) and the extreme low value (black) translate into the same value on the color scale. Saturation refers to the amount of white light mixed in with hue. That is, saturation may be thought of as how pure a color is. Greater values (i.e., more white) in the saturation channel make the color appear stronger, while lower values (i.e., less white, tending to black) make the color appear very washed out. Value refers to how bright the color is. White values have the maximum brightness, while black values have little or no brightness at all.

SUMMARY

A sequence of frames is processed to extract one or more objects from the sequence and to integrate the extracted objects into a new sequence. The new sequence may include a new background and/or an audio recording.

According to some embodiments of the invention, a foreground object is segmented from a background. When a value component of a pixel in a non-static frame exceeds a mean value of the value component for the pixel across multiple frames by a first value, the pixel is classified as foreground. When the pixel is in shadow, the pixel is classified as background. When the pixel is under different illumination and each usable component of the pixel exceeds a mean value of that component by a second value, the pixel is classified as background. Otherwise, the pixel is classified as foreground.

According to another embodiment, a sequence of frames is processed. One or more objects are extracted from a frame by classifying each pixel of the frame as being background or foreground based on a statistical model of a background in the frame, a type model of each pixel, shadow conditions, and illumination conditions. A new background is selected, and an audio recording is selected. The extracted objects are integrated with the new background and audio recording.

According to yet another embodiment, a computer includes a memory, a sequence of frames stored in the memory, and a computer program executable by the computer. The computer program comprises instructions for: (a) when a value component of a pixel in a non-static frame exceeds a mean value of the value component for the pixel across multiple frames by a first value, classify the pixel as foreground, (b) when the pixel is in shadow, classify the pixel as background, (c) when the pixel is under different illumination and each usable component of the pixel exceeds a mean value of that component by a second value, classify the pixel as background, and (d) when the pixel is not classified by acts (a), (b), or (c), classify the pixel as foreground.

According to a further embodiment of the invention, a system comprises means for extracting one or more objects from a frame by classifying each pixel of the frame as being background or foreground based on a statistical model of a background in the frame, a type model of each pixel, shadow conditions, and illumination conditions. The system also comprises means for selecting a new background, means for selecting an audio recording, and means for integrating the extracted objects with the new background and audio recording.

According to another embodiment of the invention, a computer readable storage medium is encoded with a computer program executable by a computer. The computer program comprises instructions for:

(a) when a value component of a pixel in a non-static frame exceeds a mean value of the value component for the pixel across multiple frames by a first value, classifying the pixel as foreground, (b) when the pixel is in shadow, classifying the pixel as background, (c) when the pixel is under different illumination and each usable component of the pixel exceeds a mean value of that component by a second value, classifying the pixel as background, and (d) when the pixel is not classified by acts (a), (b), or (c), classifying the pixel as foreground.

According to yet another embodiment of the invention, a computer readable storage medium encoded with a computer program executable by a computer. The computer program comprises instructions for extracting one or more objects from a frame by classifying each pixel of the frame as being background or foreground based on a statistical model of a background in the frame, a type model of each pixel, shadow conditions, and illumination conditions. The computer program further comprises instructions for selecting a new background, selecting an audio recording, and integrating the extracted objects with the new background and audio recording.

The invention is better understood upon consideration of the detailed description below, and the accompanying drawings.

BRIEF DESCRIPTION OF THE DRAWINGS

The patent or application file contains at least one drawing executed in color. Copies of this patent or patent application publication with color drawings will be provided by the Office upon request and payment of the necessary fee.

Use of the same reference symbols in different figures indicates similar or identical items.

DETAILED DESCRIPTION

In accordance with some embodiments of the invention, a computer programmed with software (referred to herein as "object extraction system") processes a sequence of frames to extract one or more objects. The extracted objects are used to create a new sequence of frames with a new background and/or audio added. In particular, a user is able to select a background and an audio recording. Alternatively, the object extraction system automatically selects a background and audio recording. The extracted objects are integrated into the selected background with the audio recording to form a new sequence.

In some embodiments, the object extraction system provides object segmentation for video sequences captured with a fixed camera. The object extraction system is capable of using information of color images based on the color characteristics of background surfaces. Furthermore, the object extraction system is capable of detecting changes with multiple criteria and under varying shadow and illumination conditions. In alternative embodiments, the camera need not be fixed.

Figure 1:
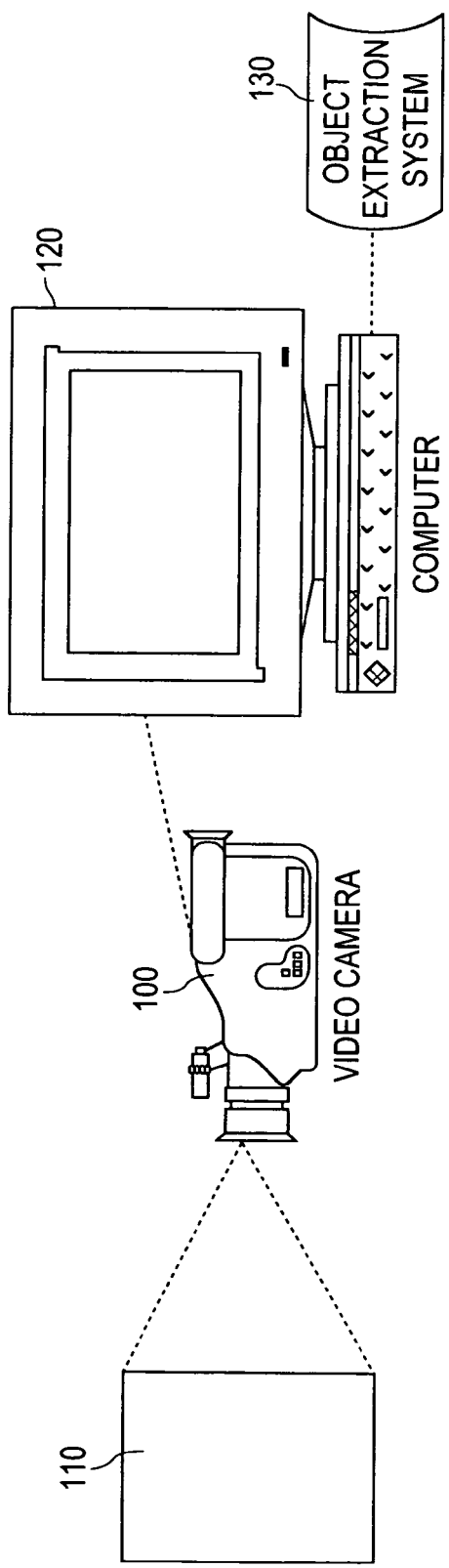
FIG. 1 is a block diagram that illustrates components of a system that may be used in some embodiments of the invention.

FIG. 1 is a block diagram that illustrates components of a system that may be used in some embodiments of the invention. In some embodiments, a video camera 100 records one or more fixed and/or moving objects 110. The video camera 100 may be in motion. The video camera 100 includes data storage that stores the video sequence. The video sequence is transferred to a computer 120, which includes a object extraction system 130 stored, for example, on a hard drive of the computer 120 or a CD-ROM (compact disc-read only memory) inserted into the CD-ROM drive of the computer 120. In other embodiments, the object extraction system 130 may be implemented as a hardware object extraction system or as a combination of hardware and software.

In some embodiments, the video camera 100 is a digital video camera. Digital video cameras offer many advantages. For example, digital images are easier to manipulate and easier to distribute over electronic media (e.g., the Internet or e-mail). In some embodiments, the video camera 100 is an analog video camera using film to record images. The film can be converted to digital images for processing with the object extraction system 130. Moreover, in some embodiments, a still picture camera, rather than video camera 100, is used to take a series of pictures that are either digitally recorded or converted to digital images. The series of pictures are transformed into a video sequence that may be processed using the object extraction system 130.

The object extraction system 130 works with both gray scale or color images. For example, each image can be a two-dimensional array of HSV (hue-saturation-value), RGB (red-green-blue) or YUV pixel values representing color pixels.

In some embodiments, the images are represented as a Microsoft Windows™ 24-bit BITMAP format. In this format, each pixel has three adjacent bytes for Blue, Green, and Red channels respectively. In some embodiments, each of the source images is W (i.e., width) by H (i.e., height) pixels. For example, the dimensions may be 720×480 pixels or 352×288 pixels.

In some embodiments, as video camera 100 captures images, the video camera 100 transfers data directly to computer 120, which has sufficient memory to hold the data. The computer 120 processes the data in real time to extract one or more objects, and, for example, transfers the data to storage, to a user monitor, or to television transmitters.

The computer 120 may be a personal computer, workstation, laptop computer, personal digital assistant, mainframe computer, or other processing device. Also, the computer 120 may be a general purpose or a special purpose computer. For example, computer 120 may be a computer having a Pentium® chip, available from computer vendors such as International Business Machines Corporation, Inc., of Armonk, N.Y. or Apple Computer, Inc. of Cupertino, Calif. The computer 120 may include an operating system, such as Microsoft® Windows® 2000 from Microsoft Corp. of Redmond, Wash.

Given ongoing advances in the data processing industry, it is conceivable that the storage and processing features illustrated in FIG. 1 may be incorporated on integrated circuits, microprocessors, and other electronics small enough to fit within a handheld video camera. Therefore, the object extraction system 130 may be incorporated into the video camera 100 as software, hardware, or a combination of hardware and software. Nevertheless, merely reducing the size or altering the location of elements of this invention does not depart from the spirit and scope of the invention.

Figure 2:
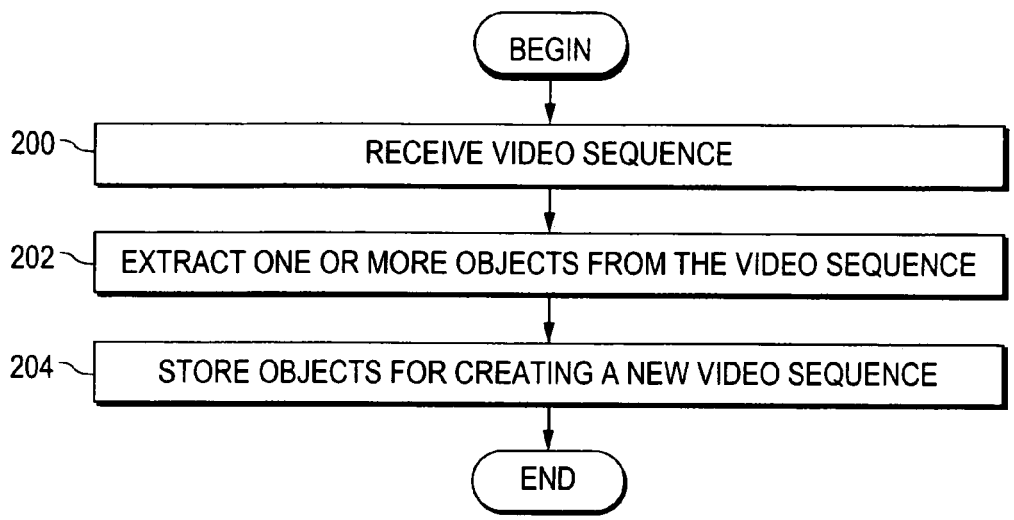
FIG. 2 is a flow diagram that illustrates processing of a video sequence in some embodiments of the invention.

FIG. 2 is a flow diagram that illustrates processing of a video sequence in some embodiments of the invention. In particular, block 200 represents the object extraction system 130 receiving a video sequence. In some embodiments, one or more of the frames of the video sequence capture a static background, and these frames will be referred to as static frames. One or more frames of the video sequence capture one or more objects moving in front of the static background, and these will be referred to as non-static frames.

Figure 3A:
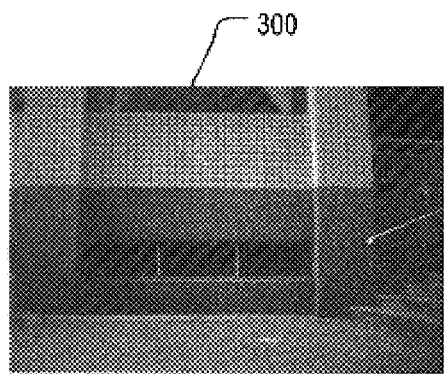
FIGS. 3A and 3B illustrate a static frame and a non-static frame, respectively, in some embodiments of the invention.
Figure 3B:
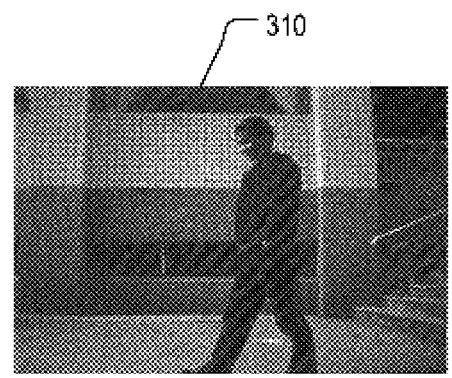

Block 202 represents the object extraction system 130 extracting one or more objects in the video sequence. In some embodiments, the object extraction system 130 identifies moving objects in a video sequence as objects to be extracted. In other embodiments, the objects in the foreground need not be moving. In particular, the object extraction system 130 identifies a frame in the video sequence as a static frame. Then, the object extraction system compares each non-static frame to the selected static frame, pixel by pixel. Each pixel in the non-static frame that does not match its corresponding pixel in the static frame is designated as being in the foreground. FIGS. 3A and 3B illustrate a static frame 300 with a static background and a non-static frame 310 that includes a foreground object (i.e., a person), respectively.

The extracted objects may be output to local data storage, remote data storage, to a user monitor, to television transmitters, or to another device. The digital images of the extracted objects may be converted to analog images. Also, the extracted objects may be output to other software for additional processing.

Block 204 represents the object extraction system 130 creating a new video sequence using one or more extracted objects. In particular, the object extraction system 130 incorporates the extracted objects into a new background and/or adds audio to create a new video sequence.

Figure 4A:
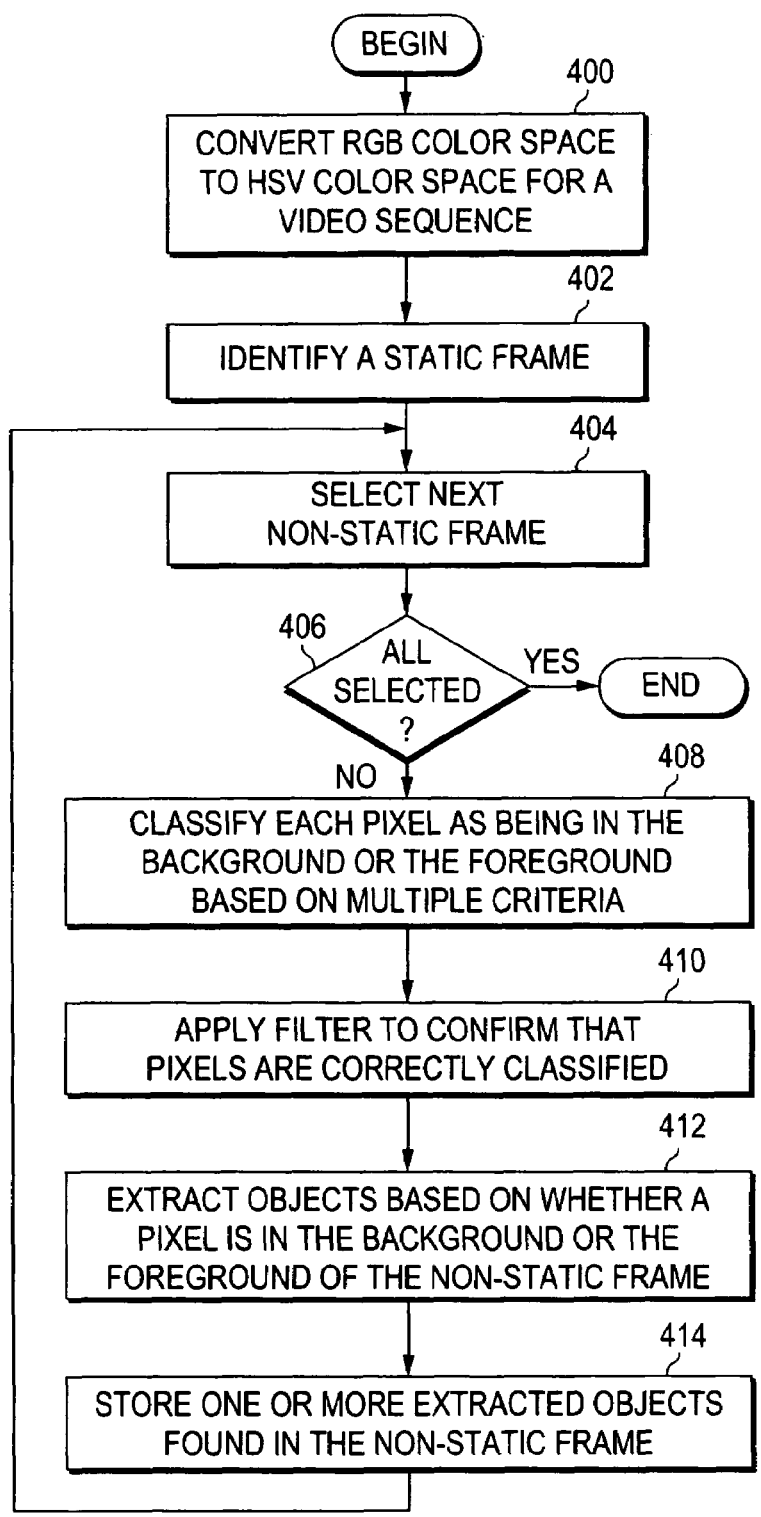
FIGS. 4A and 4B are flow diagrams that illustrate object extraction processing in some embodiments of the invention.
Figure 4B:
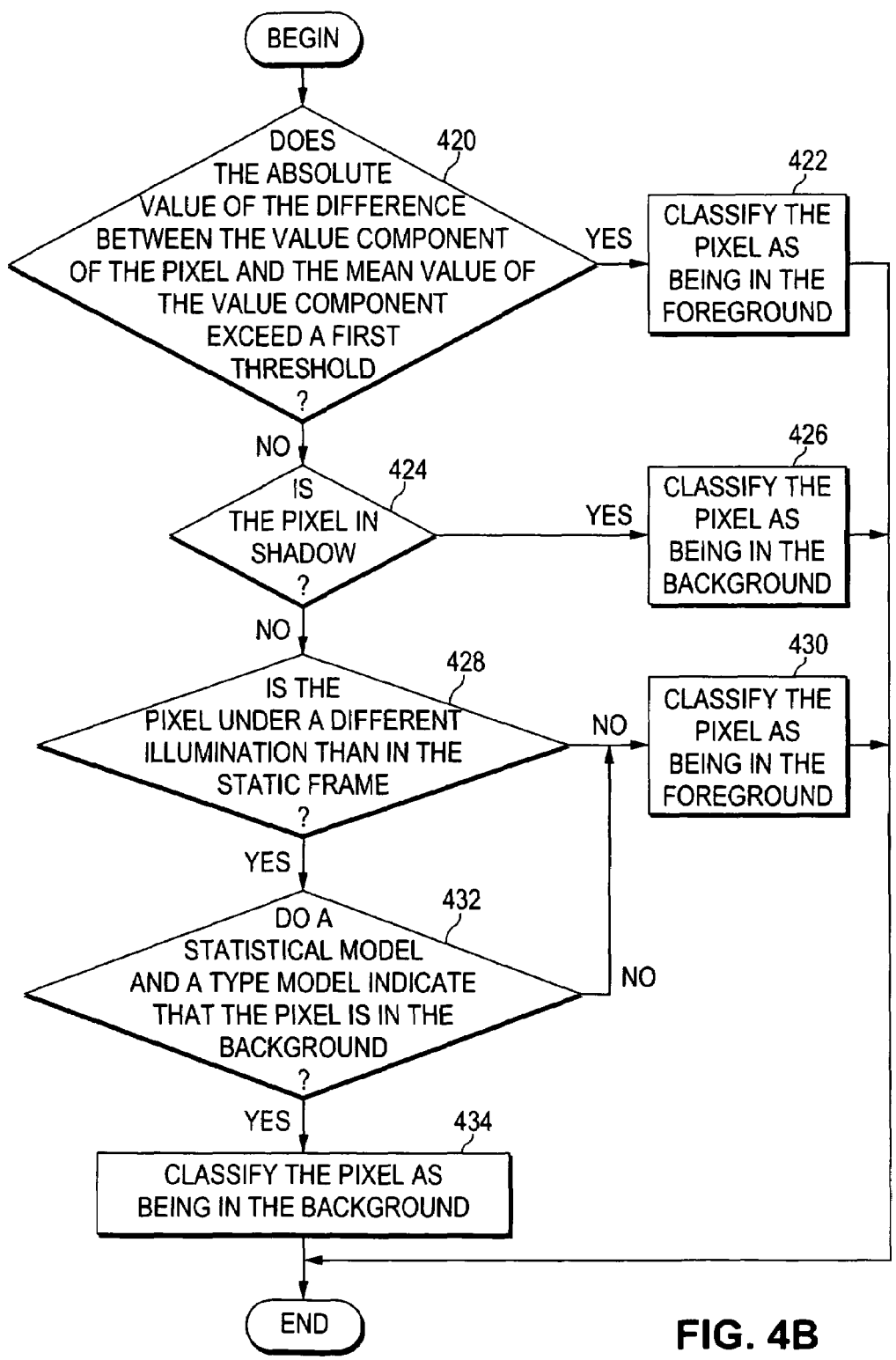

FIGS. 4A and 4B are flow diagrams that illustrate object extraction processing in some embodiments of the invention. FIG. 4A illustrates overall processing, while FIG. 4B illustrates classification of a pixel in a non-static frame as being in the foreground or background based on multiple criteria.

In some embodiments, the RGB color space is converted to one type of HSV color space, and each of the hue, saturation, and value components receives a value ranging from 0–255 for each pixel. For example, conversion of RGB color spaces to other color spaces is further described in.

Next, multiple criteria are used to determine whether a pixel in a frame is in the background or the foreground. For example, if a pixel in a non-static frame is significantly different from its corresponding pixel in a static frame, then the pixel is classified as being in the foreground. Looking at FIGS. 3A of a static frame and 3B of a non-static frame, pixel 302 and its corresponding pixel 312, they are likely to have similar values for their hue, saturation, and value components. Pixel 304 and its corresponding pixel 314 are likely to have very different values for their hue, saturation, and value components. Thus, the object extraction 130 system would label pixel 314 as being in the foreground. One technique for making this determination is the statistical model technique.

In some cases, the hue and saturation components of a pixel may fluctuate frame to frame, leading to inaccurate characterization of the pixel as being in the foreground or background. For example, a pixel in the background whose hue and saturation varies in subsequent frames may be misclassified. Thus, the object extraction system 130 also uses a type model technique to determine whether the hue and/or saturation components of a pixel should be used or rejected when determining whether the pixel is in the foreground or the background.

Furthermore, frame to frame, shadows falling on the background by foreground objects may make a background pixel appear to be in the foreground. The object extraction system 130 takes this into account in determining whether the pixel is truly in the foreground or background. Likewise, light falling on the background may make a background pixel appeal to be in the foreground, and the object extraction system 130 takes this into account in determining whether the pixel is truly in the foreground or background.

Once the pixels in a frame are classified as being in the background or foreground, the object extraction system 130 applies a filter to the frame to reclassify some pixels. This filter process ensures that the pixels are correctly classified.

Block 400 represents the object extraction system 130 converting a video sequence in an RGB color space to an HSV color space.

The use of an HSV color space is advantageous. The traditional RGB color space is used in most color cathode ray tube (CRT) monitors and color raster graphics. Though it is suitable for recording and transmitting color images, the RGB color space is actually not intuitive (i.e., not similar to the way humans perceive color) because the discriminable color difference is non-linear (i.e., this is what humans perceive as being non-linear over RGB components). Other color spaces, such as HSV and HLS (hue-lightness-saturation), more closely resemble the human vision system (HVS) and are convenient for color processing. There are several distinct advantages with these types of color spaces. For example, the component of brightness is irrelevant to chromatic information of images, so color spaces, such as the HSV color space, that do not rely on brightness are useful. Also, components of hue and saturation are intuitive, so it is useful to use color spaces based, at least in part, on hue and saturation. The term "intuitive" indicates that it is similar to the way humans perceive color.

Figure 5A:
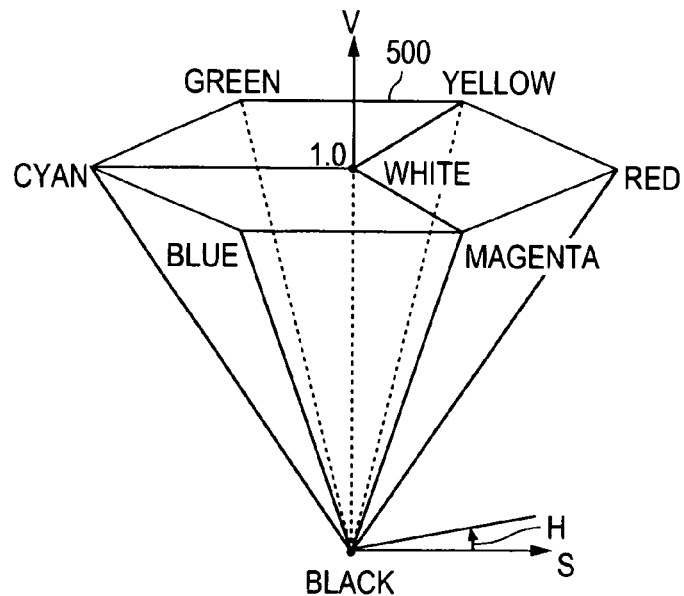
FIGS. 5A, 5B, and 5C illustrate several color spaces that may be used in embodiments of the invention.
Figure 5B:
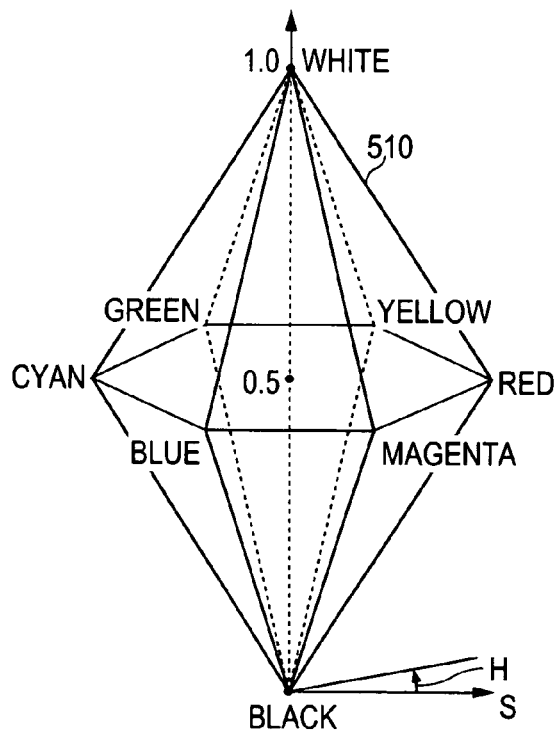
Figure 5C:
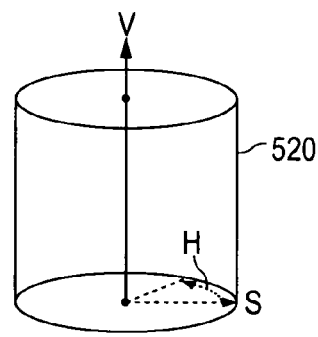

FIGS. 5A, 5B, and 5C illustrate several color spaces that may be used with embodiments of the invention. FIG. 5A illustrates an HSV color space. In FIG. 5A, the primary colors (red, green, and blue), the secondary colors (cyan, yellow, and magenta), black, and white are represented with a cone 500. FIG. 5B illustrates an HLS color space, in which the primary colors, secondary colors, black, and white are represented with a diamond shape 510. HSV and HLS color spaces have natural and intuitive dimensions, but HLS is more intuitive from the view of saturation measurement. FIG. 5C illustrates a combination and variation of the HSV and HLS color spaces, which is commonly also referred to as an HSV color space, but which will be referred to herein as an "HSV-cylinder" color space as it is represented with a cylinder 520. Appearing as a cylinder, the HSV-cylinder color space may be converted from an RGB color space very simply. Because of the simple conversion, the HSV-cylinder color space is used in some embodiments of the invention. In some embodiments, each hue, saturation, and value component in the HSV-cylinder color space is mapped to 0–255 for convenience (i.e., because each color in the RGB color space maps to 0–255). Use of the HSV-cylinder color space is a tradeoff between sufficient processing of information and speedup of performance. This is because conversion from an RGB color space to an HSV-cylinder color space is faster, but not as similar to the way humans perceive color as the HSV-cone color space. In particular, the object extraction system 130 sometimes disregards hue and/or saturation components as they may fluctuate greatly between frames.

Block 402 represents the object extraction system 130 identifying a static frame. In embodiment, the video sequence includes one or more frames that capture a static background scene, with the remaining frames capturing one or more foreground objects set against the background. In this embodiment, the object extraction system 130 may select the first frame of the video sequence as the static frame, and the remaining frames may be treated as non-static frames.

Block 404 represents the object extraction system 130 selecting a next non-static frame. Block 406 represents the object extraction system 130 determining whether all frames in the video sequence have been selected. If so, processing ends; otherwise, processing continues to block 408.

Block 408 represents the object extraction system 130 labeling each pixel in a non-static frame as being in the foreground or background using multiple criteria. Under various shadow and illumination conditions, the object extraction system 130 uses multiple criteria to classify pixels as background or foreground. The flow of making a decision is illustrated in the pseudocode in Table A. In the pseudocode, B and F denote background and foreground pixel sets, respectively. The change in the value component is represented by $\Delta V = x_{Vi} - u_{Vi}$, where $x_{Vi}$ represents the value of the value component of the ith pixel and $u_{Vi}$ represents the mean value of the value component for the ith pixel. HIGHTHRESHOLD is a high threshold that is set, in some embodiments, to the empirical value of 75. That is, a pixel in a non-static frame may be classified as being in the foreground (i.e., $i \in B$) if the change in the value (V) component is distinct enough.

TABLE A

FOR each pixel I
if |ΔV| > HIGHTHRESHOLD
   i ∈ F
ELSE IF Condition 1 is met,
   i ∈ B
ELSE
IF Condition 2 is met,
   $\alpha_V = \alpha_{VIllumination}$
   (check the proper components of H,S,V according to type model)
   IF $|x_{Ki}(t) - u_{Ki}| < \alpha_K \sigma_{Ki}$ for every usable
   component K,
      i ∈ B
      ELSE i ∈ F According to the pseudocode in Table A, if the change in the value (V) component is high, then a pixel is designated as being in the foreground (denoted F in the pseudocode). Otherwise, if the pixel is under shadow (i.e., Condition 1, which is represented by Equation (1)) is met, the pixel is designated as being in the background. On the other hand, if the pixel is under different illumination in the non-static frame than in the static frame (i.e., Condition 2 is met), the threshold for the value component is updated: $\alpha_v = \alpha_{VIllumination}$, and the proper components of hue, saturation and value are checked according to the type model. Also, if Condition 2 is met and the absolute value of the difference between the values of the components of the pixel at time (t) and the mean of the components of the pixel is less than a threshold for each usable component K (i.e., some components, such as hue and/or saturation, may fluctuate too much to be usable), the pixel is designated as being in the background. Otherwise, at this point, the pixel is designated as being in the foreground. In some embodiments, the values of thresholds $\alpha_v$, $\alpha_s$, and $\alpha_h$ (represented by $\alpha_K$, where K=H, S, or V) are set by a user via, for example, a user interface. Additionally, in some embodiments, the value of threshold $\alpha_{VIllumination}$ may be set by a user.

With reference to FIG. 4B, additional detail will be provided regarding classification of a pixel as being in the foreground or background. Block 420 represents the object extraction system 130 determining whether the absolute value of the difference between the value component of the pixel and the mean value of the value component exceeds a first threshold. If so, processing continues to block 422, otherwise, processing continues to clock 424. In block 422, the object extraction system 130 classifies the pixel as being in the foreground.

In block 424, the object extraction system 130 determines whether the pixel is in shadow. If so, processing continues to block 426, and the object extraction system 130 classifies the pixel as being in the background. Otherwise, processing continues to clock 428.

In particular, a pixel that is in the background in one frame may appear to be different in a second frame because shadow is falling on the pixel. The object extraction system 130 takes this into account and performs processing to determine whether a pixel should be classified as background or foreground.

In some embodiments, the object extraction system 130 deals with shadows by adjusting a threshold $\alpha_K$ for a component K (where K may represent hue, saturation, or value of a pixel). The threshold is used in the psuedocode in Table A.

Most traditional techniques assign $\alpha_K$ a constant value over all pixels in a frame. However, it is common to have shadows or local illumination changes due to moving objects, and so the confidence is fairly low (i.e., it is unlikely) for pixels under such conditions to be at a constant value. Thus, a constant $\alpha_K$ may result in inaccurate classifications of pixels as being in the foreground or background.

Figure 6:
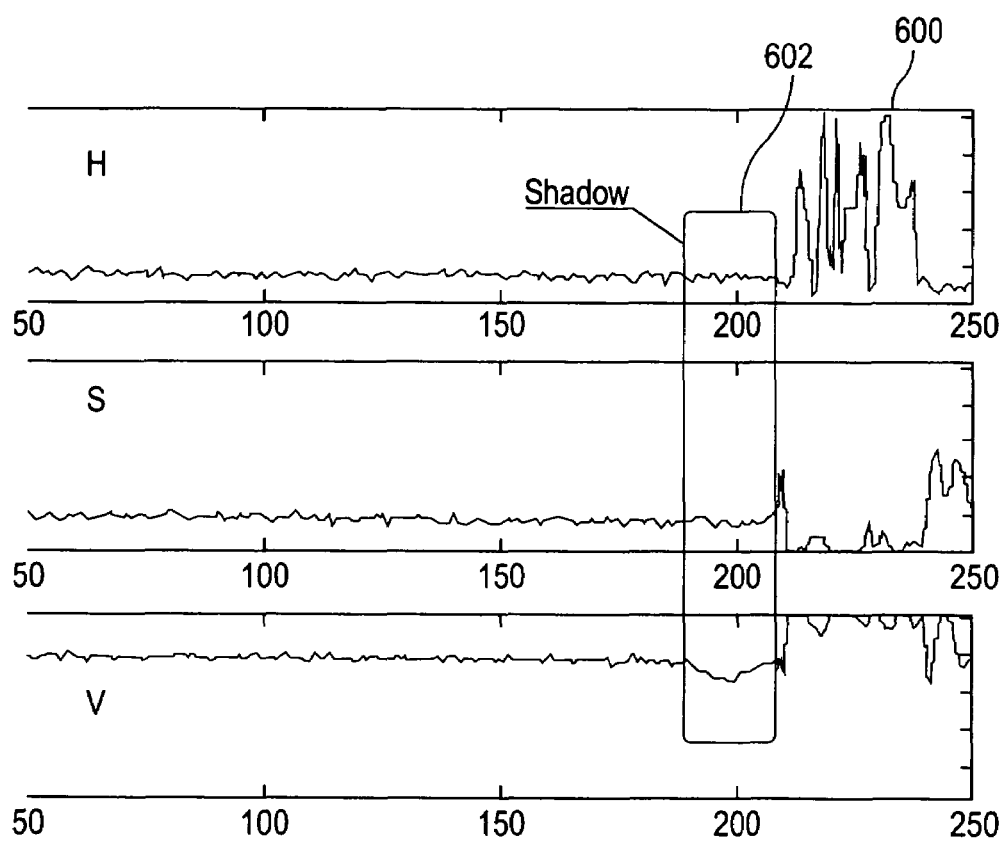
FIG. 6 illustrates a chart that shows the characteristic of hue (H), saturation (S), and value (V) components over time for shadows in some embodiments of the invention.

Using the HSV-cylinder color space, the object extraction system 130 detects shadows with an innovative technique. FIG. 6 illustrates a chart 600 that shows the characteristic of hue (H), saturation (S), and value (V) components over time for shadows 602 in some embodiments of the invention.

Shadow 602 occurs with evident decrease on value (V), but there is negligible change on both hue and saturation. Humans tend to assign a constant color (i.e., "color constancy") to an object, even under changing illumination over time or space, thus this corresponds to the human visual system. For more information on color constancy, see A. C. Hurlbert, "The Computation of Color," MIT Artificial Intelligence Laboratory Technical Report 1154, pp. 1–208, which is entirely incorporated by reference herein.

An ith pixel is part of shadow when it meets with Condition 1, which is represented by Equation (1).

$$\begin{cases} -\alpha_{VShadow}\sigma_{Vi} < x_{Vi} - u_{Vi} < 0 \\ |x_{Si} - u_{Si}| < \alpha_S \sigma_{Si} \\ |x_{Hi} - u_{Hi}| < \alpha_H \sigma_{Hi} \end{cases} \quad (1)$$

wherein the threshold $\alpha_{shadow}$ is larger than the usual $\alpha_v$. In Equation (1), all three elements are required to be true for Condition 1 to be true. In some embodiments, the value of the threshold $\alpha_{shadow}$ is set by a user via, for example, a user interface.

Block 428 represents the object extraction system 130 determining whether the pixel in the non-static frame is under a different illumination than in the static frame. A pixel that is in the background in one frame may appear to be different in a second frame because light is falling on the pixel. The object extraction system 130 takes this into account and performs processing to determine whether a pixel should be classified as background or foreground even with illumination. In particular, the object extraction system deals with global illumination changes by updating a threshold $\alpha_v$ to a larger value.

Global illumination detection takes into account the segmentation result of the last frame. With Equation (2), a pixel in a non-static frame M(i) is set to 1 if the absolute value of the difference between the value component of the pixel and the mean of the value component exceeds a standard deviation for the value component $\sigma_{vi}$, otherwise, it is set to 0. That is, the pixel in the non-static frame is set to 1 if it is in the background, and the pixel is set to 0 if it is in the foreground.

$$M(i) = \begin{cases} 1, & |x_{Vi} - u_{Vi}| > \sigma_{Vi}, x_i \in B \\ 0, & \text{otherwise} \end{cases} \quad (2)$$

The subtracted background pixels in set B={$x_i | x_i$ is background} are compared with corresponding mean for the value (V) component $u_{Vi}$. Pixels in the static frame are set to a value of 1 if they fall in the background and are set to 0 otherwise, as shown with Equation (3).

$$B_i = \begin{cases} 1, & x_i \in B \\ 0, & \text{otherwise} \end{cases} \quad (3)$$

The object extraction system 130 calculates a count with Equation (4).

$$\text{Count} = \sum_{i=1}^{n} M(i) \Big/ \sum_{i=1}^{n} B(i) \quad (4)$$

The count sums up the values of each pixel M(i), sums up the values of each pixel B(i), and divides the first by the latter. If Count>Threshold, then Condition 2 is set to True and a temporal update is taken. In particular, illumination may change over time and may be uninfluential in the near future. Thus, the temporal update refers to increasing the threshold $\alpha_k$ (which is then referred to as $\alpha_{VIllumination}$. In some embodiments, Threshold is 25%, and so if the Count exceeds 0.25, then, Condition 2 is set to True.

A popular technique for adaptation to slow changes in the scene caused by either global illumination changes or moving background objects is recursively updating the type model using an adaptive filter. A basic statistic adaptive model is further described in the Wren article. Kalman filtering for adaptation may used and is described in Christof Ridder, Olaf Munkelt, and Harold Kirchner, "Adaptive background estimation and foreground detection using Kalman-Filtering," Proc. ICRAM'95, pp. 1–7, 1995; and, D. Koller, J. Weber, T. Huang, J. Malik, G. Ogasawara, B. Rao, and S. Russell, "Towards Robust Automatic Traffic Scene Analysis in Real-Time," in ICPR94, pp. 1–6, 1994, each of which is entirely incorporated by reference herein.

However, these filters are not suitable for applications with static backgrounds that suffer from varying lightness (i.e., illumination), which is different from slowly occurring new background objects. Most illumination changes are temporal and may be uninfluential in the near future. Therefore, a recursive update will include all the information about the past and then distort the background model.

To deal with this problem, the object extraction system 130 does not update the original background model, but, instead, reduces the confidence on V by using a higher $\alpha_K$ (denoted as $\alpha_{VIllumination}$). The higher threshold is effectively adaptive to illumination changes. In some embodiments, the user sets an initial value "T", and the object extraction system 130 adjusts the threshold for $\alpha_H$, $\alpha_S$, and $\alpha_V$ based on the formulas in Table B. In some embodiments, the value of "T" may be set by the object extraction system 130 to a default value of, for example, 2.5.

TABLE B

|  | $\alpha_H$ | $\alpha_S$ | $\alpha_V$ |
|---|---|---|---|
| Normal | T * 1.5 | T * 3 | T * 1.5 |
| Shadow | T * 4 | T * 6 | T * 4 |
| Low Light | T | unused | T |

So, if a pixel is determined to be under a different illumination in block 428, the object extraction system 130 continues to block 432, otherwise, the object extraction system 130 continues to block 430 and classifies the pixel as being in the background.

In block 432, the object extraction system uses a statistical model and a type model to determine whether a pixel is in the background or foreground of the non-static frame.

A statistical model based video object segmentation determines whether a pixel in a frame is part of the background or part of the foreground. The term $\alpha_K$ (K=H,S,V), which is used in the pseudocode of Table A may not be constant for all components, but may be determined with the illumination condition. For example, the term $\alpha_V$ may be adjusted to $\alpha_{VIllumination}$ based on the illumination condition.

A statistical model of a background is used by the object extraction system 130 to determine whether a pixel in a frame is part of the background or part of the foreground. In some embodiments, the statistical model of a background is set up with N frames of static background. In some embodiments, because of white noise of a video camera, the distribution of hue, saturation, and value over time for each pixel may be represented by a normal distribution and may be assumed to be independent from each other. The term "white noise" refers to noise with a flat spectrum. White noise sounds like a waterfall and appears as "snow" on a channel of a television set that is not receiving a transmission. White noise is also defined as random noise with Guassian distribution in which the mean is zero.

Equation (5) represents a data set, which is a sample of an ith point's color component K (taking the values H, S, or V) from N frames and has mean $u_{Ki}$ and standard deviation $\sigma_{Ki}$. For each of the N frames, each pixel has a value for the hue, saturation, and value components. The mean $u_{Hi}$ represents an average value for the hue component, the mean $u_{Si}$ represents an average value for the saturation component, and the mean $u_{Vi}$ represents the average for the value component of one pixel across N frames. Likewise, the standard deviation $\sigma_{Hi}$ represents a standard deviation for the hue component, $\sigma_{Si}$ represents the standard deviation for the saturation component, and $\sigma_{Vi}$ represents the standard deviation for the value component of one pixel across N frames.

$$b^{(N)}_{Ki} \text{ (where } K=H,S,V; i=1,\ldots,N) \quad (5)$$

Equation (6) illustrates a representation of an ith pixel, where the term $x_{Hi}$ represents the hue of the ith pixel, the term $x_{Si}$, represents the saturation of the ith pixel, and the term $x_{Vi}$ represents the value of the ith pixel.

$$x^{(3)}_i = (x_{Hi}, x_{Si}, x_{Vi})^t \quad (6)$$

The probability for the ith pixel belonging to the background at time (t) is represented by Equation (7).

$$P\{u^{(3)}_i - 1 < x^{(3)}_i(t) \leq u^{(3)}_i\}, \ u_{Ki} \in [0,255] \quad (7)$$

The probability for the ith pixel belonging to the background at time t ranges from the mean minus one ($u^{(3)}_i - 1$) and the mean ($u^{(3)}_i$). In some embodiments, it is assumed that the probability is independent with respect to the hue, saturation, and value components. Therefore, the probability is calculated for each component, without factoring in the other two components. With the assumption of independence, the probability is estimated with Equation (8), where $P\{u_{Ki}-1 < x_{Ki}(t) \leq u_{Ki}\}$ is $P\{x_{Ki}(t) \leq u_{Ki}\} - P\{x_{Ki}(t) \leq u_{Ki}-1\}$.

$$\prod_{K=H,S,V} P\{u_{Ki} - 1 < x_{Ki}(t) \leq u_{Ki}\} \quad (8)$$

Equation (9) represents a normal distribution function.

$$f(x_{Ki}(t)) = \frac{1}{\sqrt{2\pi}\sigma_{Ki}} \exp\left(-\frac{(x_{Ki}(t) - u_{Ki})^2}{2\sigma_{Ki}^2}\right) \quad (9)$$

Given the normal distribution function in Equation (5) and $\Delta x_{Ki}=1$, the probability of Equation (7) is illustrated by Equation (10).

$$\frac{1}{\sqrt{2\pi}\sigma_{Ki}} \exp\left(-\sum_{K=H,S,V} \frac{(x_{Ki}(t) - u_{Ki})^2}{2\sigma_{Ki}^2}\right) \quad (10)$$

So when the absolute value of the difference between the value of a component of a pixel at a particular time ($x_{ki}(t)$) and the mean of that component ($u_{ki}$) exceeds a threshold (i.e., $|x_{Ki}(t)-u_{Ki}|<\alpha_k\sigma_{Ki}$), a pixel may be classified as being in the foreground. That is, if the value of a component of a pixel in a non-static frame is significantly different from its value in a static frame, it may be classified as a foreground pixel. In some embodiments, the threshold $\alpha_k$ is multiplied by the standard deviation. Thus, the probability determined with Equation (7) may be used to classify pixel $x^{(3)}_i(t)$ as being in the background or the foreground. The term $\alpha_K$ is dependent on illumination. In particular, $\alpha_V$ may be set to $\alpha_{VIllumination}$.

A type model of a background identifies the hue and/or saturation components that should be rejected when determining whether a pixel is in the background or foreground of a frame. It is beneficial to investigate the characteristics of hue(H), saturation(S) and value(V) that represent color images. Experiments show that the value component of pixels of all N static background scenes is fairly steady over time with relatively low variation, while the hue and saturation components fluctuate (sometimes violently) from time to time. That is, the values of the hue and saturation components may be unsteady across frames and may reflect large variations.

Figure 7A:
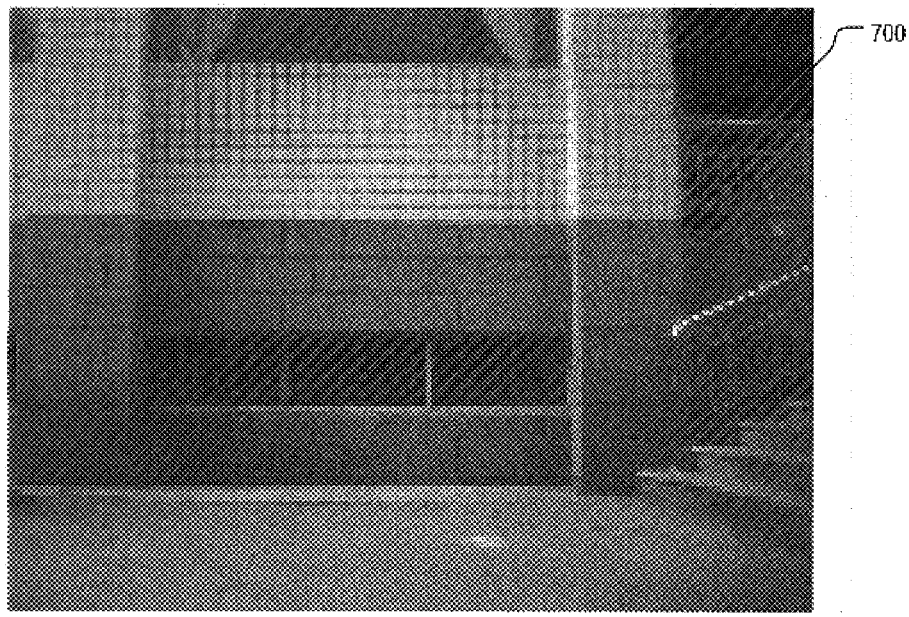
FIGS. 7A, 7B, 7C, and 7D illustrate the relationship between standard deviation and background scene in some embodiments of the invention.
Figure 7B:
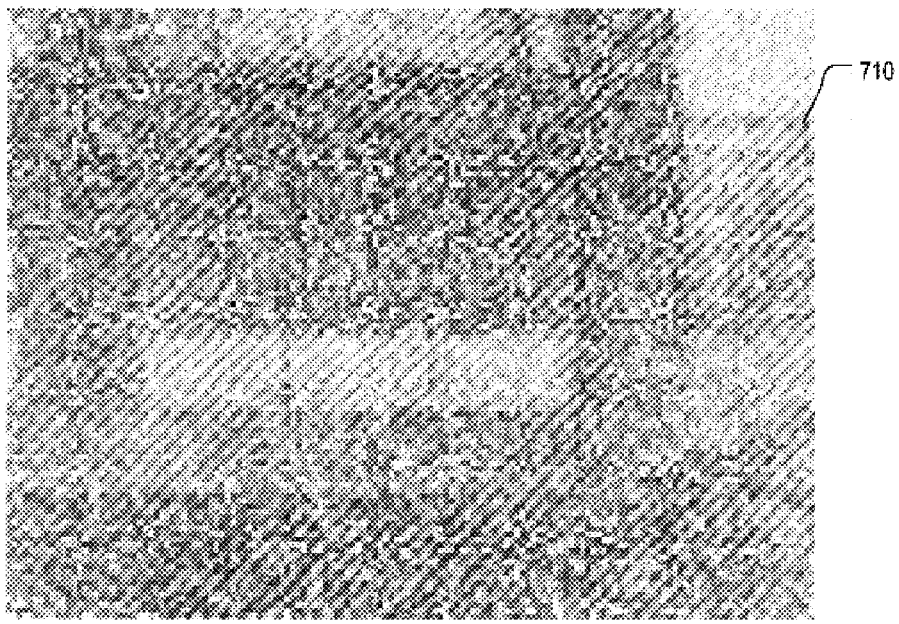
Figure 7C:
Figure 7D:
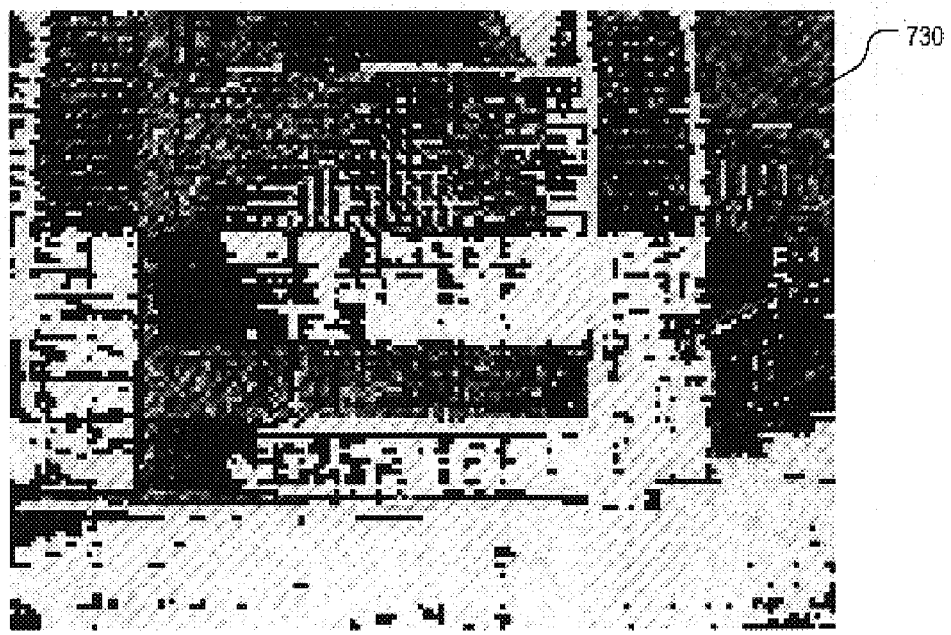

Pixels with high variations on hue or saturation appear to cluster in certain regions that are part of a background entity's surface. For example, FIGS. 7A, 7B, 7C, and 7D illustrate the relationship between standard deviation and background scene in some embodiments of the invention. FIG. 7A illustrates a frame 700 of a background scene. FIG. 7B illustrates a frame 710 representing standard deviation of the value component. FIG. 7C illustrates a frame 720 representing standard deviation of the saturation component. FIG. 7D illustrates a frame 730 representing standard deviation of the hue component.

For instance, pixels on glass have great variance on the hue and saturation components. Several reasons account for this phenomenon. For example, there exists some oddness of saturation in the commonly used HSV-cylinder color space. Oddness of saturation indicates that the conversion from the RGB color space to the saturation component of the HSV-cylinder color space does not make sense for some values. For example, when a color is very dark, its saturation is not able to reach 100% in the HSV-cone color space, but with the HSV-cylinder color space, it is possible to get 100% saturation. In particular, the saturation for a dark color should be much less than 1 (i.e., 100%), as in the HSV-cone 500. In the HSV-cylinder 520, however, the saturation for a dark color may reach 100%. Thus, conversion to the HSV-cylinder color space may lead to some inaccurate values for the saturation component of a pixel.

Referring to FIG. 4C, the commonly used HSV-cylinder color space, as compared with the HLS color space, is anti-intuitive (i.e., not similar to how humans perceive color) when the color is either too bright or too dark. Thus, the oddness of saturation imposes side-effects on the use of HSV-cylinder color space.

Another potential factor leading to variation of the hue and saturation components is the reflection characteristics of a background objects' surfaces. The surfaces inclined to reflect light strongly may mislead a cameras' work, which results in unstable data on the hue and saturation components. Under such circumstances, change detection based on a statistical model may not be reliable because the distribution of unsteady hue and saturation components deviates from the assumed normal distribution.

The value component V, however, remains steady, and few pixels suffer from abnormal distribution of hue and saturation components at the same time. Thus, the object extraction system 130 may reject the hue and/or saturation components that have potential side effects to make the segmentation technique more robust.

The type model of a background identifies the hue and/or saturation components that should be rejected when determining whether a pixel is in the background or foreground of a frame. The type model of a background will record the characteristics of background pixels in the preprocessing stage and direct the segmentation work in the following stages. This model is setup as follows:

1. Each ith pixel is assigned a type value according to its $\sigma_{Ki}$(K=H,S,V). In particular, the hue and/or saturation components may be discarded if the standard deviation of that component exceeds a certain threshold (i.e., when $\sigma_{Ki}$>Threshold, K=H,S). In some embodiments, the Threshold is 25, however, in other embodiments, the threshold may be lower, higher, or may be represented by a range. With hue and/or saturation components being discarded, the type may be value (V), value-saturation (VS), value-hue (VH), or value-hue-saturation (VHS), representing four kinds of combinations of usable components in the detection stage. For example, if the standard deviation of the hue component of a pixel is 26, and the saturation component of the pixel is 20, the hue component is discarded, and the pixel is assigned a type value of VS. Once each pixel in a frame is assigned a type value, the pixels in the frame are mapped to a "type image" that indicates the type of each pixel in an image. In some embodiments, V is represented by 0, VS is represented by 1, VH is represented by 2, and VHS is represented by 3. So, in the type image, each pixel is associated with one of these values. Thus, generation of a type model results in generation of a type image in which each pixel is assigned a type.

2. The obtained "type image" is smoothed with a 5*5-window median filter. The type model is constructed to present characteristics of regions. For a 5*5 pixel area in a type image, the object extraction system 130 computes the median of the values of each pixel based on the type value of 0, 1, 2, or 3. Then, the object extraction system 130 sets the center pixel in the 5*5 pixel region to be the median value. The 5*5-window is moved around the type image until all of the pixels in the frame have been processed.

For example, a 5*5 pixel area shown in Table C may have the following type values:

TABLE C

| | | | | |
|---|---|---|---|---|
| 0 | 1 | 1 | 2 | 2 |
| 1 | 1 | 2 | 2 | 2 |
| 3 | 1 | 1 | 2 | 1 |
| 3 | 3 | 2 | 2 | 1 |
| 3 | 2 | 2 | 2 | 1 |

The median value in the 5*5 pixel area is 2. The center pixel is currently set to 1, and is changed to the median value 2, resulting in the following 5*5 pixel area shown in Table D:

TABLE D

| | | | | |
|---|---|---|---|---|
| 0 | 1 | 1 | 2 | 2 |
| 1 | 1 | 2 | 2 | 2 |
| 3 | 1 | 2 | 2 | 1 |
| 3 | 3 | 2 | 2 | 1 |
| 3 | 2 | 2 | 2 | 1 |

Figure 8A:
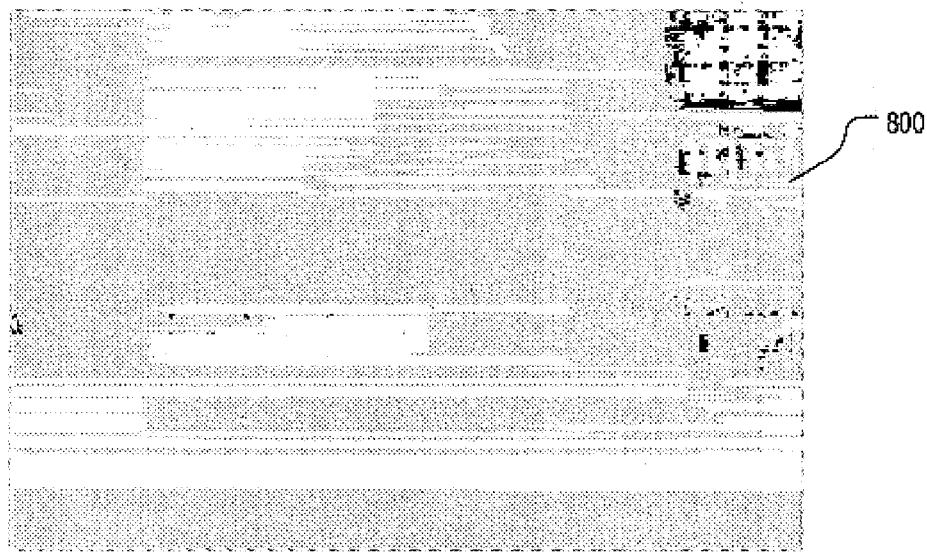
FIGS. 8A and 8B illustrate a type image of the background scene in FIG. 7A in some embodiments of the invention.
Figure 8B:

FIGS. 8A and 8B illustrate a type image of the background scene in FIG. 7A in some embodiments of the invention. In particular, FIG. 8A illustrates a type image 800 before the smoothing is performed, and FIG. 8B illustrates the type image 810 after the smoothing is performed. In some embodiments, the type values for V, VS, VH and VHS may be represented by different colors, for example, red, purple, yellow and white respectively, in a "type image".

In block 432, if the object extraction system 130 uses the statistical model and type model to classify a pixel as being in the background, processing continues to block 434, and the object extraction system 130 classifies the pixel as being in the background. Otherwise, processing continues to block 430, and the object extraction system 130 classifies the pixel as being in the foreground.

Continuing with FIG. 4A, block 410 represents the object extraction system 130 applying a filter to confirm that pixels are correctly classified as being the foreground or background.

The result of segmenting objects may be "noisy" or may result in an image having "small holes." The term "noisy" refers to pixels that are misclassified, while the term "small holes" is an instance of "noisy" pixels and refers to pixels that are misclassified as being in the background. In some embodiments, the object extraction system 130 applies one or more post-processing operations to remove the noise and fill in the small holes. In some embodiments, different post-processing operations may be performed in addition to or instead of the post-processing operations discussed herein.

Initially, a non-static frame is converted to a binary image, so that each pixel value is 0 or 1, with 0 indicating that the pixel is in the foreground and 1 indicating that the pixel is in the background.

A first post-processing operation is a morphology-like filter that can remove noisy regions and fill small holes. A second post-processing operation labels major connected components with a sequential scan labeling technique. The sequential scan labeling technique identifies connected regions in an image. For more information on identifying connected regions, see Raphael C. Gonzalez and Richard E. Woods, Digital Image Processing, Addison-Wesley Publishing Company, pp. 41–43, September 1993, which is entirely incorporated by reference herein.

The first post-processing operation is able to eliminate discrete noisy points or small noisy regions by applying a filter core, which is also referred to as a convolution core, to a non-static frame. A filter core that is used in some embodiments of the invention is shown in Table E.

TABLE E

| | | | | |
|---|---|---|---|---|
| 1 | 1 | 1 | 1 | 1 |
| 1 | 0 | 0 | 0 | 1 |
| 1 | 0 | 0 | 0 | 1 |
| 1 | 0 | 0 | 0 | 1 |
| 1 | 1 | 1 | 1 | 1 |

In essence, if most of a pixel's neighbors are in the foreground, then it is likely that the pixel is in the foreground. Likewise, if most of a pixel's neighbors are in the background, then the pixel is likely to be in the background. In some embodiments, the object extraction system 130 applies the filter core of Table E to a 5*5 pixel area of a non-static frame. The elements of the pixel core correspond to values of the 5*5 pixel area of the non-static frame. The object extraction system 130 obtains an average of the values of the 5*5 pixel area of the non-static frame. Since the elements at the edges of the filter core have the value 1, while the elements inside the edges of the filter core have the value 0, the average of the pixel area of the non-static frame is really an average of the values of the pixels at the edges of the pixel area. For example, a 5*5 pixel area may have the values illustrated in Table F. The average pixel value for the 5*5 pixel area of Table F is 0.56 (i.e., $14/25$).

TABLE F

| | | | | |
|---|---|---|---|---|
| 0 | 1 | 1 | 1 | 1 |
| 1 | 1 | 0 | 0 | 1 |
| 1 | 0 | 1 | 0 | 1 |
| 1 | 0 | 0 | 1 | 1 |
| 1 | 1 | 1 | 1 | 0 |

In some embodiments, the filter core is applied twice. The first time the filter core is applied, the filter window size may be 8 and the threshold may be 15. That is, the pixel area is 8*8, and if the average pixel value exceeds the threshold of 15, the center pixel is classified as foreground, otherwise the center pixel is not modified. The second time the filter core is applied, the filter window size may be 5 and the threshold may be 3. That is, the pixel area is 5*5, and if the average pixel value exceeds the threshold of 3, the center pixel is classified as foreground, otherwise the center pixel is not modified.

For example, the center pixel in the 5*5 pixel area of Table F is 1, which indicates that it is in the background. Because the average pixel value of the 5*5 pixel area is 0.56, the center pixel is not modified.

This non-linear filter core is better than the usual morphologic filter when noisy points are clustering. In particular, noisy points (e.g., "small holes") are a non-linear problem and can not be handled with a linear filter. Moreover, this filter core may be implemented with a fast technique for its special structure. According to the special structure of the filter core, the computation for each pixel based on the result of a preceding pixel, thus the computational time is reduced.

Results from the first operation may still have noisy regions and holes. Therefore, the filter core may be applied twice. After this two pass sequential scan labeling, connected components of objects are marked, while small noisy regions are deleted. That is, in the first pass, the sequential scan labeling removes the small holes that were misclassified as background regions, and, in the second pass, the sequential scan labeling removes small regions that are misclassified as foreground. Thus, two types of misclassification (i.e., "noise") are corrected. Performing this technique in the same way on background pixels can patch up holes because it will regard holes as noise in the background and label it as foreground.

The object extraction system 130 has been applied to video object segmentation from both indoor and outdoor video sequences. The results show high accuracy and robustness with various qualities of sequences.

Figure 9:
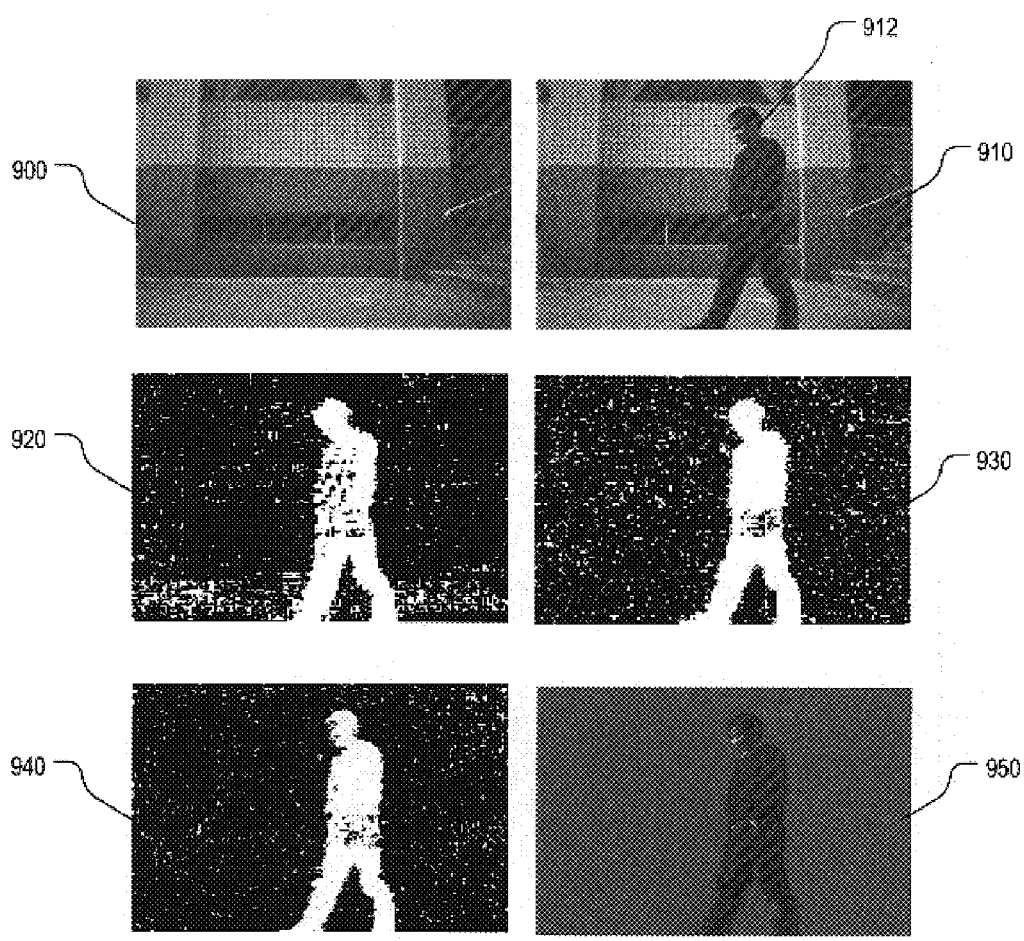
FIG. 9 illustrates a video sequence captured outdoors in some embodiments of the invention.

FIG. 9 illustrates a video sequence captured outdoors in some embodiments of the invention. In particular, frame 900 illustrates a background scene, and frame 910 illustrates a scene 910 that is to be segmented and that includes an individual 912. Frame 920 illustrates results before post processing using the Horprasert technique. Frame 930 illustrates results before post processing using the Wren technique. Frame 940 illustrates results before post processing using the object extraction system 130. Frame 950 illustrates a scene after post-processing using the object extraction system 130.

Frames in FIG. 9 illustrate the ability to eliminate shadows and restrain global illumination changes. The sequence illustrated with FIG. 9 is captured indoors, with changing light, as the individual is moving, and there is a large area of shadow around the individual. The Horprasert and Wren techniques appear to fail in this environment.

Figure 10:
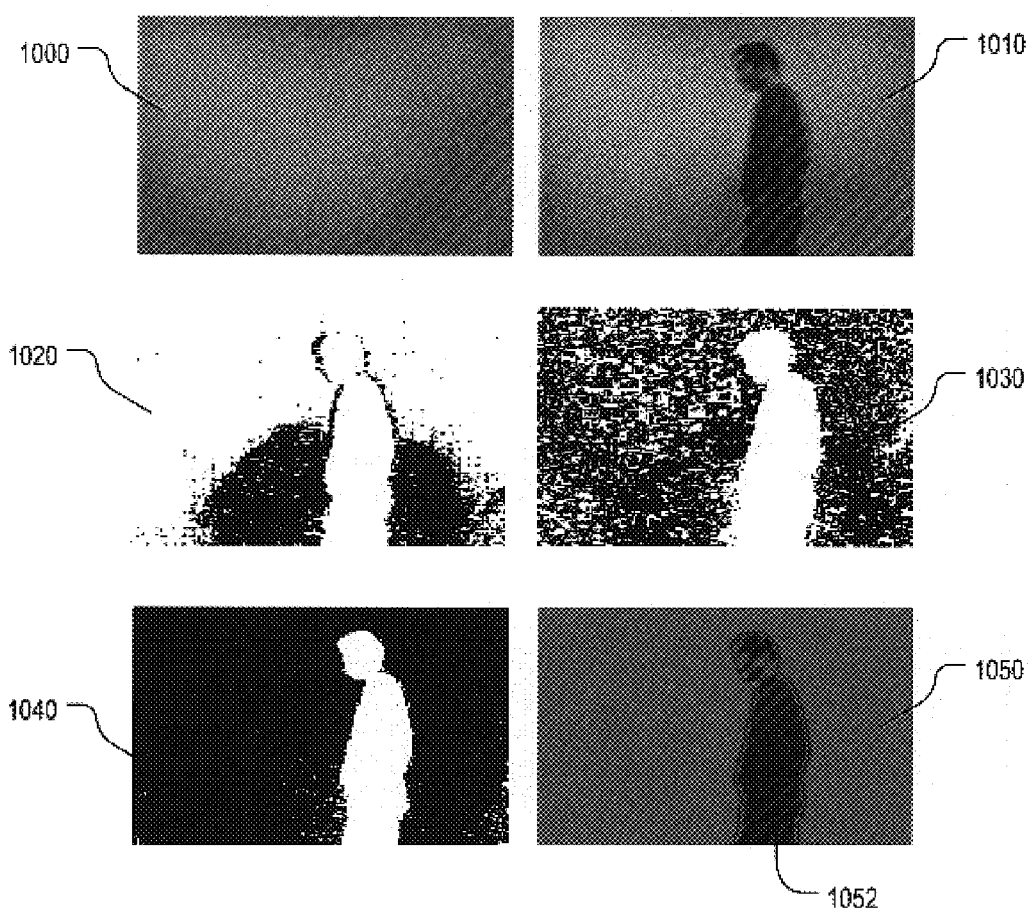
FIG. 10 illustrates post-processing of a video sequence in some embodiments of the invention.

FIG. 10 illustrates post-processing of a video sequence in some embodiments of the invention. Frame 1000 illustrates a background scene, and frame 1010 illustrates a scene 1010 that is to be segmented. Frame 1020 illustrates results before post processing using the Horprasert technique. Frame 1030 illustrates results before post processing using the Wren technique. Frame 1040 illustrates results before post processing using the object extraction system 130. Frame 1050 illustrates a scene after post-processing using the object extraction system 130.

Block 412 represents the object extraction system 130 extracting objects based on whether a pixel is in the foreground or the background. For example, pixels in a region that are labeled as foreground are identified as a foreground object. In frame 1050, the person 1052 would be identified as a foreground object.

Block 414 represents the object extraction system 130 storing one or more extracted objects found in the non-static frame. Then, processing loops back to block 404 to select the next non-static frame.

Figure 11:
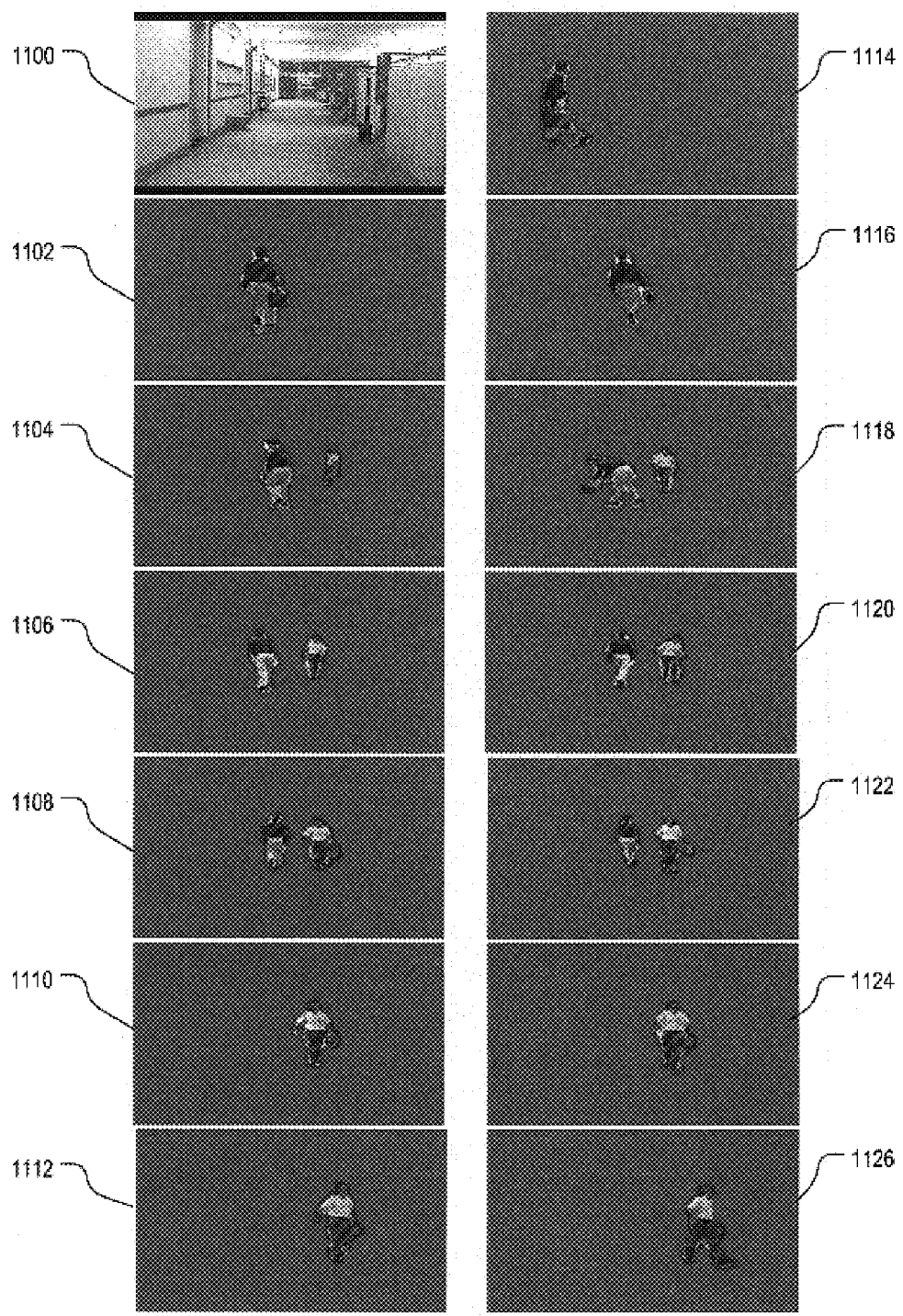
FIG. 11 illustrates a result of applying the object extraction system to a standard MPEG test video sequence in some embodiments of the invention.

The final result of applying the object extraction system 130 to a standard MPEG test sequence is illustrated in FIG. 11 in some embodiments of the invention. In particular, frame 1100 illustrates a static frame, while the remaining frames 1102–1126 illustrate foreground objects extracted from the background. The foreground objects had previously moved across the static background.

In some embodiments, the frame rate of the object extraction system 130 is 7 frames per second on a Pentium™ III 500 CPU for color images under 320*240 resolution.

Figure 12:
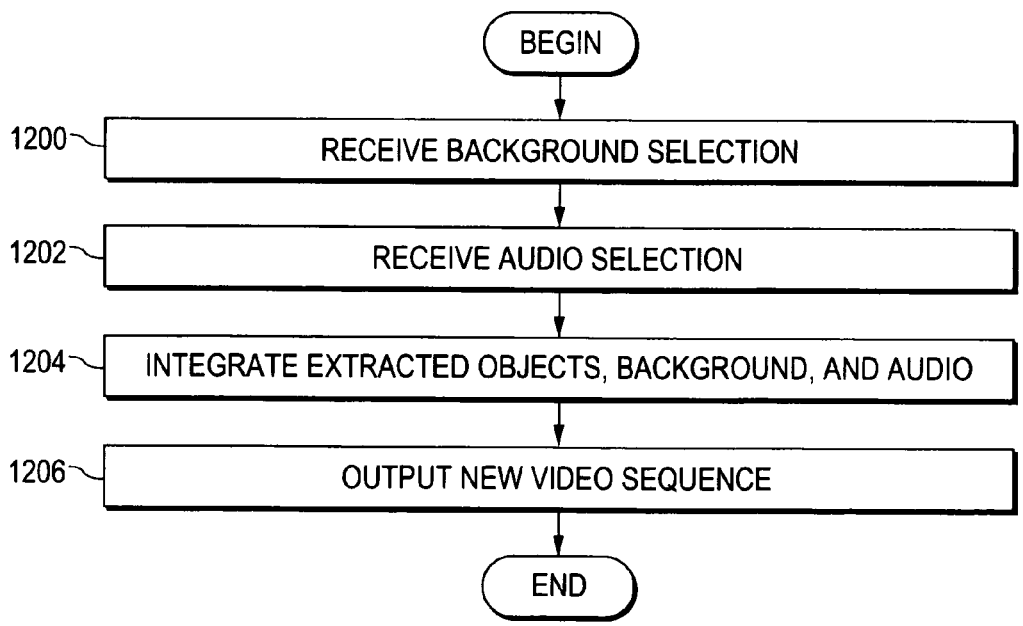
FIG. 12 is a flow diagram that illustrates creation of a new video sequence in some embodiments of the invention.

FIG. 12 is a flow diagram that illustrates creation of a new video sequence in some embodiments of the invention. In particular, block 1200 represents the object extraction system 130 receiving selection of a background for a new video sequence. For example, a user may select a background depicting a beach in Hawaii or a bridge in San Francisco, Calif. In some embodiments, the object extraction system 130 may automatically select the background. For example, the object extraction system 130 may request some information from a user (e.g., age, preferred travel destinations, hobbies), and may automatically select a background for the user based on this information. Alternatively, the automatic selection of the background by the object extraction system 130 may be random.

Block 1202 represents the object extraction system 130 receiving an audio selection. For example, a user may select music to be integrated with the background. In some embodiments, the object extraction system 130 may automatically select the audio. For example, the object extraction system 130 may request some information from a user (e.g., age, location of residence, and college education), and may automatically select music for the user based on this information. Alternatively, the automatic selection of the audio by the object extraction system 130 may be random.

Block 1204 represents the object extraction system 130 integrating one or more extracted objects into the background with the selected audio. In some embodiments, the object extraction system 130 extracts one or more objects from a frame, and then integrates the same extracted objects into a new frame that is to be part of a new video sequence with the selected background and music. For example, if the existing video sequence processed in block 200 has 10 frames, then the objects extracted from each frame are pasted into corresponding frames in a new video sequence having 10 frames and the selected background. In this embodiment, the extracted objects are pasted at corresponding locations. For example, if an object in the existing video sequence was located at position (8,5), then it is pasted at position (8,5) in the new video sequence. In some embodiments, the user is able to select extracted objects to be pasted into a frame of the new video sequence. Moreover, in some embodiments, the user is able to specify the position (e.g., X-Y coordinate location) and orientation (e.g., rotate left, rotate right, flip vertical, or flip horizontal) of the objects.

Block 1206 represents the object extraction system 130 outputting a new video sequence.

Figure 13:
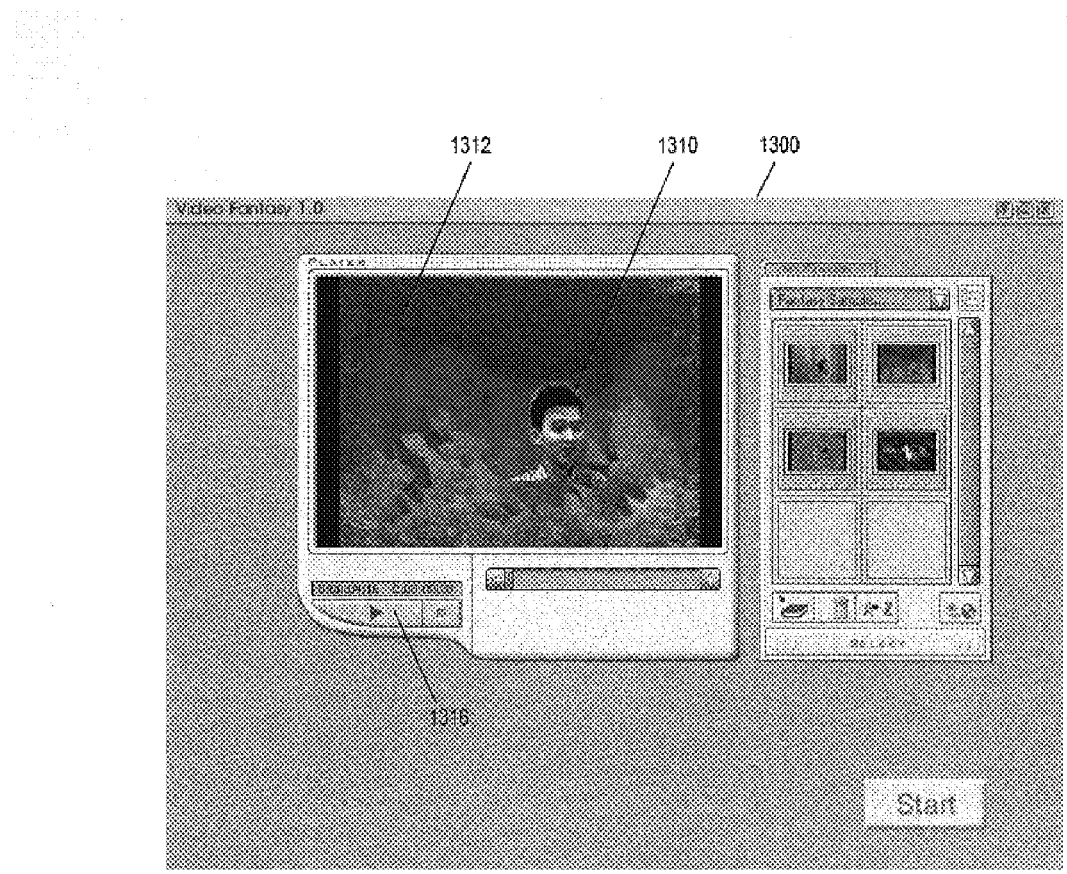
FIG. 13 illustrates a user interface that shows the output of the object extraction system in some embodiments of the invention.

FIG. 13 illustrates a user interface 1300 that shows the output of the object extraction system 130 in some embodiments of the invention. For example, object 1310 has been extracted from a video sequence. Object 1310 has been placed on background 1312, which is one of the backgrounds available for selection in panel 1314. Additionally, audio may be selected to be incorporated into the video sequence. A player 1316 allows playing of the new video sequence.

Therefore, the object extraction system 130 is able to provide a robust and real-time technique for video object segmentation from a still background. The essential characteristics of the surface in a background scene are considered and a multi-criteria decision on change detection is adopted. Thus, the object extraction system makes full and better use of color information in images than other techniques.

That is, in some embodiments, to extract an object, the object extraction system 130 provides real-time video object segmentation from a static background using an HSV color space and taking into account shadows and varying illumination. After converting a video sequence from a RGB color space to an HSV color space, the object extraction system learns a statistical model and a type model for the background scene. The type model represents color characteristics of the background surface and is used by the object extraction system to decide whether the component of hue or saturation should be used to detect changes caused by occluding objects (i.e., objects that block light). Next, in a detection stage, the object extraction system detects objects against the background. The object extraction system uses multiple criteria to detect the objects while dealing with shadows and changing illumination conditions. Once pixels in a frame are classified as background and foreground pixels, the object extraction system applies a speedup morphology-like filter and a sequential scan labeling technique to refine the segmentation results.

Microsoft and Windows 2000 are trademarks of Microsoft, Inc. of Redmond, Wash. Pentium is a trademark of Intel, Corp.

Although the invention has been described with reference to particular embodiments, the description is only an example of the invention's application and should not be taken as a limitation.

Additionally, the invention may be tangibly embodied as software in a computer-readable device or media, such as memory, data storage devices, and/or data communication devices, thereby making a product or article of manufacture according to the invention. As such, the terms "article of manufacture" and "computer program product" and "computer-readable storage medium" as used herein are intended to encompass software accessible from any computer readable device or media. Using the present specification, the invention may be implemented as a machine, process, or article of manufacture by using programming and/or engineering techniques to produce software, firmware, hardware, or any combination thereof.

Various other adaptations and combinations of features of the embodiments disclosed are within the scope of the invention as defined by the claims.

We claim:

1. A method for classifying an object in a non-static frame as foreground or background, comprising:
   (a) classifying a pixel in the non-static frame as foreground when a value component of the pixel exceeds a mean value of the value component for the pixel across multiple frames by a first value;
   (b) classifying the pixel as background when the pixel is in shadow;
   (c) classifying the pixel as background when the pixel is under different illumination and each usable component of the pixel exceeds a mean value of that component by a second value; and
   (d) classifying the pixel as foreground when the pixel is not classified by acts (a), (b), or (c).

2. The method of claim 1, wherein the first value comprises a first threshold.

3. The method of claim 2, wherein the first threshold is an empirical value of 75.

4. The method of claim 1, wherein the second value comprises a standard deviation of a component multiplied by a second threshold.

5. The method of claim 1 wherein the second value is dependent on illumination conditions.

6. The method of claim 1, further comprising:
   adjusting one or more pixels of the non-static frame by applying a filter core to the non-static frame.

7. The method of claim 6, wherein the non-static frame is a first frame, and further comprising:
   mapping each pixel in the first frame to a binary value;
   generating a second frame comprised of the binary values of each pixel; and
   applying the filter core to the second frame.

8. The method of claim 1, wherein the non-static frame is part of a sequence of frames and wherein one of the other frames in the sequence is a static frame.

9. The method of claim 8, further comprising identifying the static frame in the sequence.

10. The method of claim 1, wherein a component is usable if the standard deviation of the component does not exceed a threshold.

11. The method of claim 10, wherein the threshold comprises 25.

12. The method of claim 10, wherein the component is a hue component.

13. The method of claim 10, wherein the component is a saturation component.

14. The method of claim 1, further comprising:
   extracting a foreground object by selecting one or more pixels classified as foreground.

15. The method of claim 14, further comprising:
   extracting multiple foreground objects.

16. The method of claim 1, further comprising:
   providing a user interface, wherein the user interface enables a user to select a new background.

17. The method of claim 16, further comprising:
   extracting one or more foreground objects from the non-static frame; and
   integrating the extracted foreground objects with the new background.

18. The method of claim 1, further comprising:
   providing a user interface, wherein the user interface enables a user to select an audio recording.

19. The method of claim 18, further comprising:
   extracting one or more foreground objects from the non-static frame; and
   integrating the extracted foreground objects with the audio recording.

20. The method of claim 1, wherein the non-static frame comprises pixels in a RGB color space and further comprising:
   converting the RGB color space to a type of HSV color space.

21. A method for processing a sequence of frames, comprising:
   extracting one or more objects from a frame by classifying each pixel of the frame as being background or foreground, said classifying each pixel comprising:
     (a) classifying a pixel in the frame as foreground when a value component of the pixel exceeds a mean value of the value component for the pixel across multiple frames by a first value;
     (b) classifying the pixel as background when the pixel is in shadow;
     (c) classifying the pixel as background when the pixel is under different illumination and each usable component of the pixel exceeds a mean value of that component by a second value; and
     (d) classifying the pixel as foreground when the pixel is not classified by acts (a), (b), or (c);
   selecting a new background;
   selecting an audio recording; and
   integrating the extracted objects with the new background and the audio recording.

22. The method of claim 21, further comprising:
   applying a filter core to the frame to confirm that each pixel has been accurately classified as background or foreground.

23. A system, comprising:
   a computer including a memory;
   a sequence of frames stored in the memory; and
   a computer program executable by the computer, the computer program comprising instructions for classifying an object in a non-static frame from the sequence of frame as foreground or background, the instructions comprising:
(a) classifying in a pixel in the non-static frame as foreground when a value component of the pixel exceeds a mean value of the value component for the pixel across multiple frames in the sequence of frames by a first value;
(b) classifying the pixel as background when the pixel is in shadow;
(c) classifying the pixel as background when the pixel is under different illumination and each usable component of the pixel exceeds a mean value of that component by a second value; and
(d) classifying the pixel as foreground when the pixel is not classified by acts (a), (b), or (c).

24. The system of claim 23, wherein the first value comprises a first threshold.

25. The system of claim 24, wherein the first threshold is an empirical value of 75.

26. The system of claim 23, wherein the second value comprises a standard deviation of a component multiplied by a second threshold.

27. The system of claim 23 wherein the second value is dependent on illumination conditions.

28. The system of claim 23, wherein the computer program further comprises instructions for:
adjusting one or more pixels of the non-static frame by applying a filter core to the frame.

29. The system of claim 28, wherein the non-static frame is a first frame, and wherein the computer program further comprises instructions for:
mapping each pixel in the first frame to a binary value;
generating a second frame comprised of the binary values of each pixel; and
applying the filter core to the second frame.

30. The system of claim 23, wherein one of the frames in the sequence of frames comprises a static frame.

31. The system of claim 30, wherein the computer program further comprises instructions for:
identifying the static frame in the sequence of frames.

32. The system of claim 23, wherein a component is usable if the standard deviation of the component does not exceed a threshold.

33. The system of claim 32, wherein the threshold comprises 25.

34. The system of claim 32, wherein the component is a hue component.

35. The system of claim 32, wherein the component is a saturation component.

36. The system of claim 23, wherein the computer program further comprises instructions for:
extracting a foreground object by selecting one or more pixels classified as foreground.

37. The system of claim 36, wherein the computer program further comprises instructions for:
extracting multiple foreground objects.

38. The system of claim 23, wherein the computer program further comprises instructions for:
providing a user interface, wherein the user interface enables a user to select a new background.

39. The system of claim 38, wherein the computer program further comprises instructions for:
extracting one or more foreground objects from the non-static frame; and
integrating the extracted foreground objects with the new background.

40. The system of claim 23, wherein the computer program further comprises instructions for:
providing a user interface, wherein the user interface enables a user to select an audio recording.

41. The system of claim 40, wherein the computer program further comprises instructions for:
extracting one or more foreground objects from the non-static frame; and
integrating the extracted foreground objects with the audio recording.

42. The system of claim 23, wherein the non-static frame comprises pixels in a RGB color space and wherein the computer program further comprises instructions for:
converting the RGB color space to a type of HSV color space.

43. A system, comprising:
means for extracting one or more objects from a frame by classifying each pixel of the frame as being background or foreground, said classifying comprising:
(a) classifying a pixel as foreground when a value component of the pixel exceeds a mean value of the value component for the pixel across multiple frames by a first value;
(b) classifying the pixel as background when the pixel is in shadow;
(c) classifying the pixel as background when the pixel is under different illumination and each usable component of the pixel exceeds a mean value of that component by a second value; and
(d) classifying the pixel as foreground when the pixel is not classified by acts (a), (b), or (c);
means for selecting a new background;
means for selecting an audio recording; and
means for integrating the extracted objects with the new background and audio recording.

44. The system of claim 43, further comprising:
means for applying a filter core to the frame to confirm that each pixel has been accurately classified as background or foreground.

45. A computer readable storage medium encoded with a computer program executable by a computer, the computer program comprising instructions for classifying an object in a non-static frame as foreground or background, wherein the instructions comprise:
(a) classifying a pixel in the non-static frame as foreground when a value component of the pixel exceeds a mean value of the value component for the pixel across multiple frames by a first value;
(b) classifying the pixel as background when the pixel is in shadow;
(c) classifying the pixel as background when the pixel is under different illumination and each usable component of the pixel exceeds a mean value of that component by a second value; and
(d) classifying the pixel as foreground when the pixel is not classified by acts (a), (b), or (c).

46. The computer readable storage medium of claim 45, wherein the first value comprises a first threshold.

47. The computer readable storage medium of claim 46, wherein the first threshold is an empirical value of 75.

48. The computer readable storage medium of claim 45, wherein the second value comprises a standard deviation of a component multiplied by a second threshold.

49. The computer readable storage medium of claim 45, wherein the second value is dependent on illumination conditions.

50. The computer readable storage medium of claim 45, wherein the computer program further comprises instructions for:
adjusting one or more pixels of the non-static frame by applying a filter core to the frame.

51. The computer readable storage medium of claim 50, wherein the non-static frame is a first frame, and wherein the computer program further comprises instructions for:
mapping each pixel in the first frame to a binary value;
generating a second frame comprised of the binary values of each pixel; and
applying the filter core to the second frame.

52. The computer readable storage medium of claim 45, wherein the non-static frame is part of a sequence of frames and wherein one of the frames is a static frame.

53. The computer readable storage medium of claim 52, wherein the computer program further comprises instructions for:
identifying the static frame in the sequence.

54. The computer readable storage medium of claim 45, wherein a component is usable if the standard deviation of the component does not exceed a threshold.

55. The computer readable storage medium of claim 54, wherein the threshold comprises 25.

56. The computer readable storage medium of claim 54, wherein the component is a hue component.

57. The computer readable storage medium of claim 54, wherein the component is a saturation component.

58. The computer readable storage medium of claim 45, wherein the computer program further comprises instructions for:
extracting a foreground object by selecting one or more pixels classified as foreground.

59. The computer readable storage medium of claim 58, wherein the computer program further comprises instructions for:
extracting multiple foreground objects.

60. The computer readable storage medium of claim 45, wherein the computer program further comprises instructions for:
providing a user interface, wherein the user interface enables a user to select a new background.

61. The computer readable storage medium of claim 60, wherein the computer program further comprises instructions for:
extracting one or more foreground objects from the non-static frame; and
integrating the extracted foreground objects with the new background.

62. The computer readable storage medium of claims 45, wherein the computer program further comprises instructions for:
providing a user interface, wherein the user interface enables a user to select an audio recording.

63. The computer readable storage medium of claim 62, wherein the computer program further comprises instructions for:
extracting one or more foreground objects from the non-static frame; and
integrating the extracted foreground objects with the audio recording.

64. The computer readable storage medium of claim 45, wherein the non-static frame comprises pixels in a RGB color space and wherein the computer program further comprises instructions for:
converting the RGB color space to a type of HSV color space.

65. A computer readable storage medium encoded with software instructions, wherein the the software instructions comprise:
extracting one or more objects from a frame by classifying each pixel of the frame as being background or foreground, said classifying comprising:
(a) classifying a pixel in the frame as foreground when a value component of the pixel exceeds a mean value of the value component for the pixel across multiple frames by a first value;
(b) classifying the pixel as background when the pixel is in shadow;
(c) classifying the pixel as background when the pixel is under different illumination and each usable component of the pixel exceeds a mean value of that component by a second value; and
(d) classifying the pixel as foreground when the pixel is not classified by acts (a), (b), or (c);
selecting a new background;
selecting an audio recording; and
integrating the extracted objects with the new background and audio recording.

66. The computer readable storage medium of claim 65, wherein the computer program further comprises instructions for:
applying a filter core to the frame to confirm that each pixel has been accurately classified as background or foreground.

* * * * *